United States Patent
Zhang et al.

(10) Patent No.: US 12,153,259 B2
(45) Date of Patent: Nov. 26, 2024

(54) CLOSED-TRACK OPTICAL DELAY MODULES, TERAHERTZ SYSTEMS AND PHOTOELECTRIC SYSTEMS

(71) Applicant: CAPITAL NORMAL UNIVERSITY, Beijing (CN)

(72) Inventors: Zhenwei Zhang, Beijing (CN); Cunlin Zhang, Beijing (CN)

(73) Assignee: CAPITAL NORMAL UNIVERSITY, Beijing (CN)

( * ) Notice: Subject to any disclaimer, the term of this patent is extended or adjusted under 35 U.S.C. 154(b) by 0 days.

(21) Appl. No.: 18/429,992

(22) Filed: Feb. 1, 2024

(65) Prior Publication Data

US 2024/0168231 A1    May 23, 2024

Related U.S. Application Data

(63) Continuation-in-part of application No. PCT/CN2022/083665, filed on Mar. 29, 2022.

(30) Foreign Application Priority Data

Sep. 29, 2021   (CN) .......................... 202111148714.3

(51) Int. Cl.
   *G02B 6/28*       (2006.01)
   *G02F 1/01*       (2006.01)

(52) U.S. Cl.
   CPC .......... *G02B 6/2861* (2013.01); *G02F 1/0128* (2013.01); *G02F 2201/205* (2013.01); *G02F 2203/13* (2013.01)

(58) Field of Classification Search
   CPC ................ G02B 6/2861; G02F 1/0128; G02F 2201/205; G02F 2201/20; G02F 2203/13
   See application file for complete search history.

(56) References Cited

U.S. PATENT DOCUMENTS

| | | | |
|---|---|---|---|
| 5,066,088 A | 11/1991 | Davies et al. | |
| 7,382,962 B1 * | 6/2008 | Yao | ........................ G01M 11/31 385/136 |
| 2021/0382261 A1 | 12/2021 | Lee | |

FOREIGN PATENT DOCUMENTS

| | | |
|---|---|---|
| CN | 2513125 Y | 9/2002 |
| CN | 103293604 A | 9/2013 |

(Continued)

OTHER PUBLICATIONS

CN 108845390 A (English Translation) (Year: 2018).*

(Continued)

*Primary Examiner* — Balram T Parbadia
*Assistant Examiner* — Mary A El-Shammaa
(74) *Attorney, Agent, or Firm* — PORUS IP LLC

(57) ABSTRACT

A closed-track optical delay module, a terahertz system, and a photoelectric system are provided. The closed-track optical delay module comprises a first constraint component with a closed-track line structure, a second constraint component with a straight line groove, a third constraint component with a positioning convex, a light conversion device, a housing, and a driving control device. The positioning convex forms a constraint fit relationship with the closed curve groove and straight line groove. One of the first, second, and third constraint components is connected with the driving control device, the other is fixedly disposed, a next one is connected with the light conversion device and moves parallel to the straight line groove. A light input interface is used for an incident light to be irradiated onto the light conversion device. A light output interface is used for a delayed beam to be emitted from the housing.

7 Claims, 7 Drawing Sheets

(56) References Cited

FOREIGN PATENT DOCUMENTS

| | | | |
|---|---|---|---|
| CN | 105891958 A | 8/2016 | |
| CN | 108845390 A | * 11/2018 | ........... G02B 6/2861 |
| CN | 109998471 A | 7/2019 | |
| CN | 210038294 U | 2/2020 | |
| CN | 211905829 U | 11/2020 | |
| CN | 112051236 A | 12/2020 | |
| CN | 113589436 A | 11/2021 | |
| JP | 2016206529 A | 12/2016 | |

OTHER PUBLICATIONS

International Search Report in PCT/CN2022/083665 mailed on May 30, 2022, 7 pages.
First Office Action in Chinese Application No. 202111148714.3 mailed on Nov. 15, 2021, 12 pages.
Notification to Grant Patent Right for Invention in Chinese Application No. 202111148714.3 mailed on Dec. 7, 2021, 4 pages.

* cited by examiner

500

┌─ 510
Constructing, based on a connection feature, a track feature of a closed-track line structure, a device feature of the light conversion device, and a target optical delay time, a vector to be matched

↓

┌─ 520
Determining, based on the vector to be matched, a candidate power by searching in a reference database

↓

┌─ 530
Determining, based on the connection feature, the track feature, the device feature, and the candidate power, an operating power by a processor

FIG. 5

CLOSED-TRACK OPTICAL DELAY MODULES, TERAHERTZ SYSTEMS AND PHOTOELECTRIC SYSTEMS

CROSS-REFERENCE TO RELATED APPLICATIONS

The present disclosure is Continuation-In-Part of the International Patent Application No. PCT/CN2022/083665, filed on Mar. 29, 2022, which claims priority to Chinese Patent Application No. 202111148714.3, filed on Sep. 29, 2021, the entire contents of each of which are hereby incorporated by reference.

TECHNICAL FIELD

The present disclosure relates to the technical field of photoelectric systems, and in particular, to a closed-track optical delay module, a terahertz system, and a photoelectric system.

BACKGROUND

An optical delay line is an opto-mechanical integrated device capable of changing a length of an optical path, which is able to realize the transformation of spatial displacement to time delay. A delay range of the optical delay line determines a time range of a time-domain signal; and a beam transmission quality of the optical delay line determines a quality of signal acquisition, which jointly determines a quality of a set of time-domain photoelectric system. Therefore, in the field of photoelectric detection system integration, the design and development of an optical delay module are crucial to the efficiency of the photoelectric detection system. In recent years, as the rapid development of the photoelectric detection system, the spectral range has almost covered the entire electromagnetic spectrum, a variety of time-varying photoelectric signal acquisition systems are in urgent need of high-quality and high-efficiency optical delay devices.

Therefore, it is to provide a closed-track optical delay module, a terahertz system, and a photoelectric system.

SUMMARY

The present disclosure provides a closed-track optical delay module, comprising: a first constraint component with a closed-track line structure, a second constraint component with a straight line groove, a third constraint component with a positioning convex, a light conversion device, a light input interface, a light output interface, a base, a housing, and a driving control device. The first constraint component may be configured as a cylindrical component. The closed-track line structure may be disposed on a circumferential wall of the cylindrical component. The closed-track line structure may be in a form of a smooth curve. The smooth curve may be a continuous smooth curve or a segmented continuous smooth curve. The closed-track line structure may be a closed curved groove. A length of the straight line groove of the second constraint component may not be less than a straight-line distance between two end surfaces of the closed curved groove. The positioning convex of the third constraint component may form a constraint fit relationship with the closed curved groove and the straight line groove, respectively. One of the first constraint component, the second constraint component, and the third constraint component may be connected with the driving control device to be driven to rotate. One of the first constraint component, the second constraint component, and the third constraint component may be fixedly arranged. Another of the first constraint component, the second constraint component, and the third constraint component may be connected with the light conversion device and move parallel to the straight line groove. The light input interface and the light output interface may be disposed on the housing. The light input interface may be used for an incident light to be irradiated onto the light conversion device. The light output interface may be used for a delayed beam to be emitted from the housing. The delayed beam may be formed by the incident light passing through the light conversion device.

The present disclosure further provides a terahertz system comprising the closed-track optical delay module.

The present disclosure further provides a photoelectric system comprising the closed-track optical delay module.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering denotes the same structure, wherein:

FIG. 5 is a flowchart illustrating an exemplary process of determining an operating power according to some embodiments of the present disclosure;

DETAILED DESCRIPTION

Figure 1:
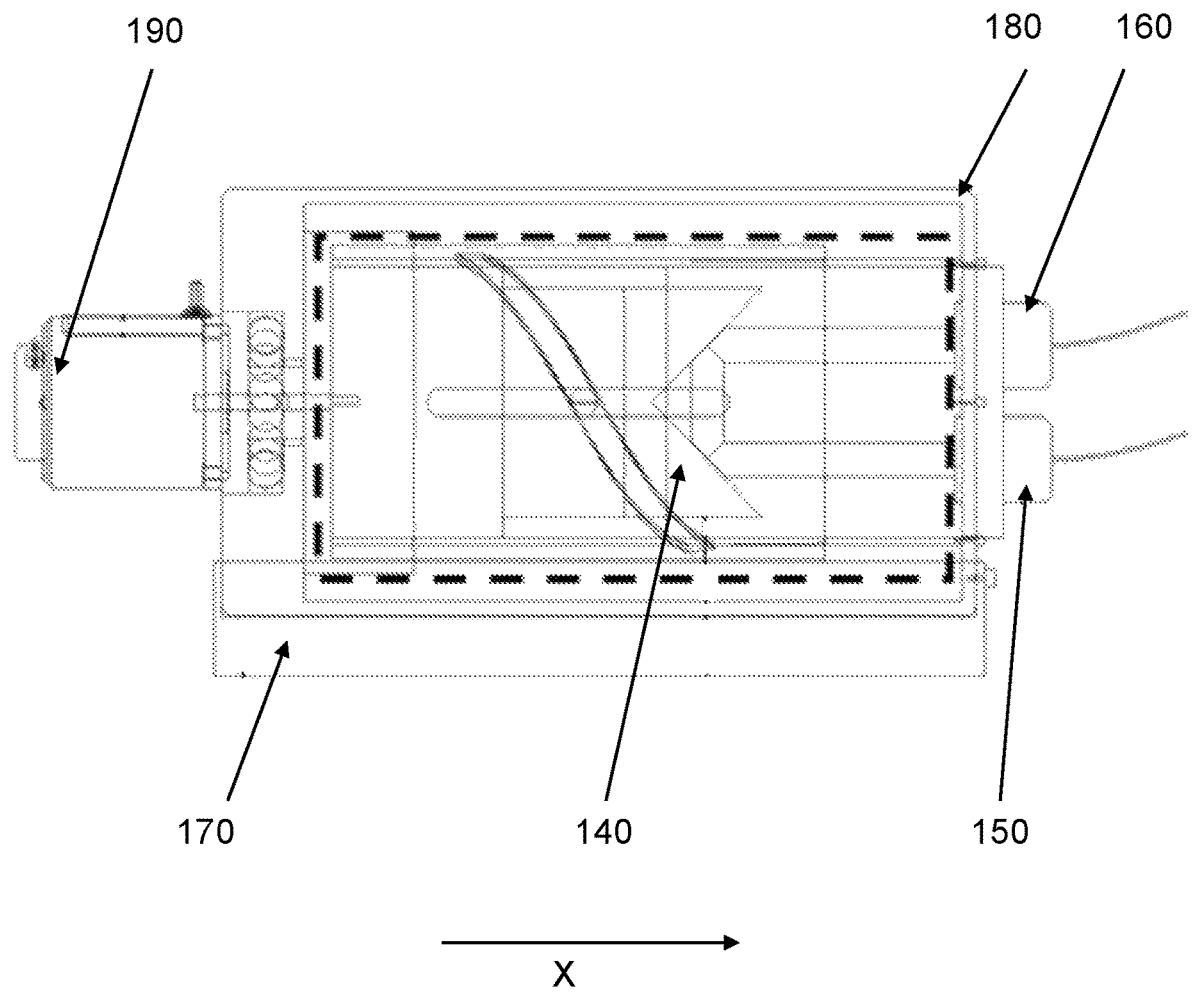
FIG. 1 is a schematic structural diagram illustrating a closed-track optical delay module according to some embodiments of the present disclosure.

In order to more clearly illustrate the technical solutions of the embodiments of the present disclosure, the following briefly introduces the drawings that need to be used in the description of the embodiments. Apparently, the accompanying drawings in the following description are only some examples or embodiments of the present disclosure, and those skilled in the art can also apply the present disclosure to other similar scenarios according to the drawings without creative efforts. Unless obviously obtained from the context or the context illustrates otherwise, the same numeral in the drawings refers to the same structure or operation.

It should be understood that "system", "device", "unit" and/or "module" as used herein is a method for distinguishing different components, elements, parts, portions or assemblies of different levels. However, the words may be replaced by other expressions if other words can achieve the same purpose.

As indicated in the disclosure and claims, the terms "a", "an", and/or "the" are not specific to the singular form and may include the plural form unless the context clearly indicates an exception. Generally speaking, the terms "comprising" and "including" only suggest the inclusion of clearly identified steps and elements, and these steps and elements do not constitute an exclusive list, and the method or device may also contain other steps or elements.

The flowchart is used in the present disclosure to illustrate the operations performed by the system according to the embodiments of the present disclosure. It should be understood that the preceding or following operations are not necessarily performed in the exact order. Instead, various steps may be processed in reverse order or simultaneously. Meanwhile, other operations may be added to these procedures, or a certain step or steps may be removed from these procedures.

Figure 2:
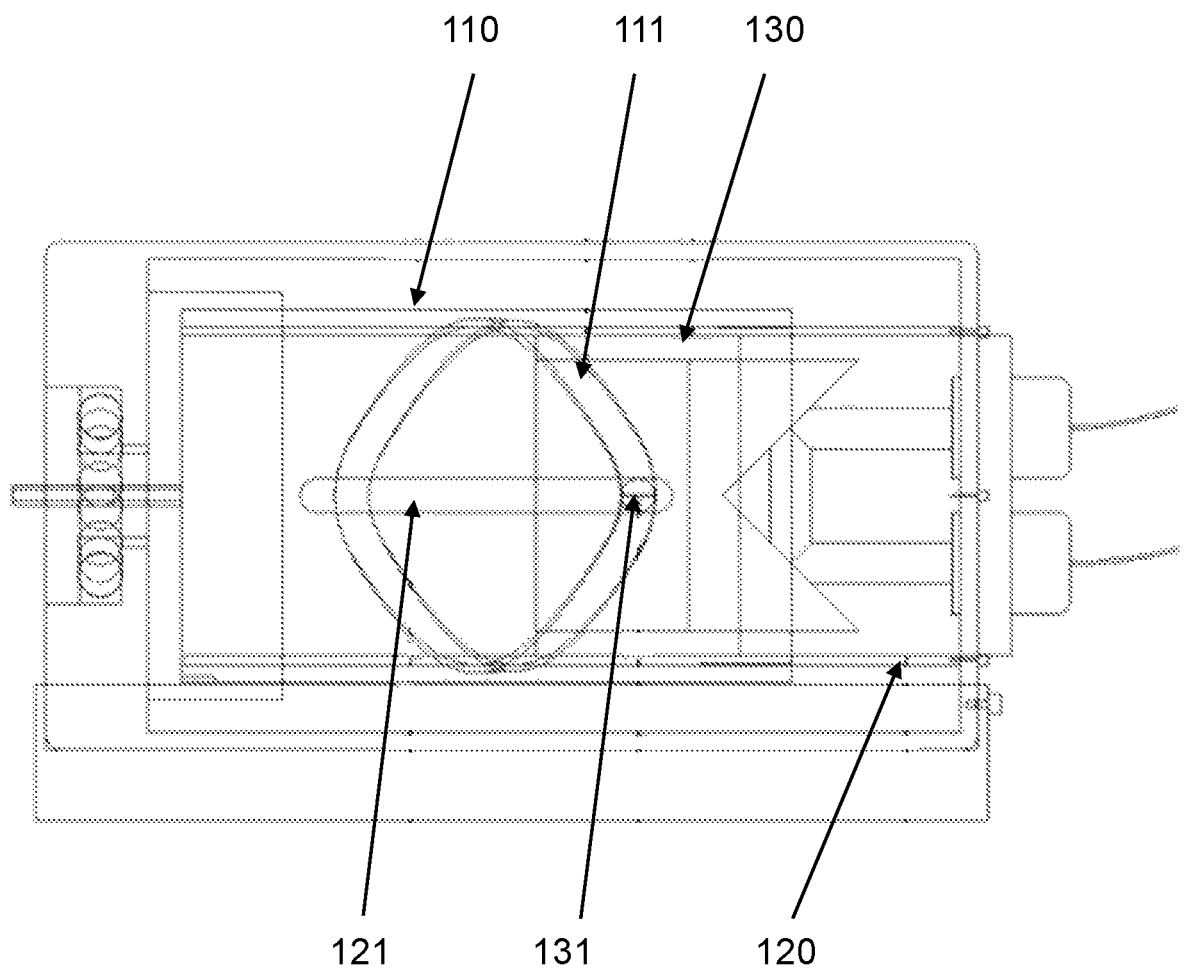
FIG. 2 is a schematic structural diagram illustrating a closed-track optical delay module according to some embodiments of the present disclosure.

FIG. 1 is a schematic structural diagram illustrating a closed-track optical delay module according to some embodiments of the present disclosure. FIG. 2 is a schematic structural diagram illustrating a closed-track optical delay module according to some embodiments of the present disclosure.

As illustrated in FIG. 1 and FIG. 2, a closed-track optical delay module 100 may comprise a first constraint component 110, a second constraint component 120, a third constraint component 130, a light conversion device 140, a light input interface 150, a light output interface 160, a base 170, a housing 180, and a driving control device 190.

In some embodiments, the first constraint component 110 may be configured as a cylindrical component. A closed-track line structure 111 may be disposed on a circumferential wall of the cylindrical component. A track line of the closed-track line structure 111 may be in a form of a smooth curve. The smooth curve may be a continuous smooth curve or a segmented continuous smooth curve.

In some embodiments, the closed-track line structure 111 may be a closed curved groove.

In some embodiments, the second constraint component 120 may be provided with a straight line groove 121. A length of the straight line groove 121 may not be less than a straight-line distance between two end surfaces of the closed-track line structure 111. In some embodiments, a length direction of the straight line groove 121 may be parallel to an axial direction (e.g., an X-direction in FIG. 1) of the first constraint component 110.

The third constraint component 130 may be provided with a positioning convex 131. The positioning convex 131 may form a constraint fit relationship with the closed curved groove and the straight line groove 121, respectively. That is, the positioning convex 131 may slide relative to the closed curved groove and the straight line groove 121, respectively.

The length of the straight line groove 121 may be greater than or equal to the straight-line distance between the two end surfaces where vertices of the closed curved groove is located, the end surfaces is perpendicular to the axial direction of the first constraint component.

In some embodiments, one of the first constraint component 110, the second constraint component 120, and the third constraint component 130 may be connected with the driving control device 190 to be driven to rotate. The other of the first constraint component 110, the second constraint component 120, and the third constraint component 130 may be fixedly arranged. A next one of the first constraint component 110, the second constraint component 120, and the third constraint component 130 may be connected with the light conversion device 140 and move parallel to the straight line groove 121.

In some embodiments, the light input interface 150 and the light output interface 160 may be disposed on the housing 180. The light input interface 150 may be used for an incident light to be irradiated onto the light conversion device 140. The light output interface 160 may be used for a delayed beam passing through the light conversion device 140 to be emitted from the housing 180.

In some embodiments, the second constraint component 120 and the third constraint component 130 may not be limited to the cylindrical component, but may also be other shape structures corresponding to the second constraint component 120 and the third constraint component 130. The driving control device 190 may be fixed on the housing 180. The housing 180 may be fixed on the base 170.

In some embodiments, during operation, the driving control device 190 may drive one of the first constraint component 110, the second constraint component 120, and the third constraint component 130 to rotate. The other of the first constraint component 110, the second constraint component 120, and the third constraint component 130 may be fixedly disposed. A next one of the first constraint component 110, the second constraint component 120, and the third constraint component 130 may move parallel to the straight line groove 121. For example, the driving control device 190 may be fixedly disposed and may be connected with the first constraint component 110 and drive the first constraint component 110 to rotate. The second constraint component 120 may be fixedly disposed. The third constraint component 130 may be connected with the light conversion device 140 and move parallel to the straight line groove 121. The movement parallel to the straight line groove 121 herein may be understood as that the third constraint component 130 moves along the straight line groove 121, i.e., the third constraint component 130 may realize linear movement with the rotation of the first constraint component 110 and mutual constraint fit of the closed-track optical delay module 100, the straight line groove 121, and the positioning convex 131. The light conversion device 140 may be connected with the third constraint component 130, so that the light conversion device 140 may realize linear movement. The light input interface 150 and the light output interface 160 may be disposed on the housing 180, so that an incident light input from the light input interface 150 may be irradiated onto the light conversion device 140, and a delayed beam reflected by the light conversion device 140 may be emitted out of the housing 180 through the light output interface 160.

In some embodiments, the closed-track line structure 111 may be disposed on a circumferential wall of the first constraint component 110, so that the first constraint component 110 may form a closed-loop high-speed rotation along with the driving of the driving control device 190. The positioning convex 131 disposed on the third constraint component 130 may move along a direction of the straight line groove 121. The light conversion device 140 may be disposed on the third constraint component 130 to ensure undistorted light, thereby allowing for high-speed optical delay during the high-speed rotation of the first constraint component 110, and greatly improving the detection efficiency of a photoelectric detection system.

Optical delay refers to a process for driving a reflective device (e.g., the light conversion device 140) to move by a driving structure to change a length of an optical path.

In some embodiments, the first constraint component 110 may be configured as an outer cylinder. The second constraint component 120 may be configured as a middle cylinder. The third constraint component 130 may be configured as an inner cylinder. The third constraint component 130 may be provided with the light conversion device 140 which moves with an axial direction of the third constraint component 130, converting a change of light from a spatial domain to a temporal domain, thereby realizing time delay of the light.

In some embodiments, the housing 180 may be provided with the light input interface 150 for light input. In some embodiments, the light input interface 150 may include a light-transmitting window sheet and/or an optical fiber coupling device. In some embodiments, the light input interface 150 may be connected with an optical fiber which is connected with the light conversion device 140. An input light may be accessed through the optical fiber and converted into a parallel light through optical fiber coupling device on the optical fiber. In some embodiments, the housing 180 may be provided with the light output interface 160 for light output. In some embodiments, the light output interface 160 may include a light-transmitting window sheet and/or an optical fiber coupling device. In some embodiments, the light output interface 160 may be connected with an optical fiber which is connected with the light conversion device 140. An output light may be transmitted through the optical fiber. The parallel light returned by the light conversion device 140 may be coupled into the optical fiber through the optical fiber coupling device on the optical fiber, and then exported from the optical fiber.

In some embodiments, the driving control device 190 may be a programmable motor configured to provide a force for the rotation of the first constraint component 110, and to control a rotational speed, as well as to provide feedback on position, speed, trigger parameters, and coding parameters.

In some embodiments, the base 170 may be coordinated with the housing 180 to ensure a stability of the optical path when the entire closed-track optical delay module is placed on an absolutely fixed reference plane.

In some embodiments, a track line of the closed-track line structure may be in a form of a smooth curve. The smooth curve may be a continuous smooth curve or a segmented continuous smooth curve. In some embodiments, the continuous smooth curve may be represented by an elliptical line, thereby achieving a cosine time interval delay change. A starting point may be related to a selection of a timing zero point, which may be arbitrarily selected. In some embodiments, an equation of the elliptical line is expressed by $$x = r_0 \cos\theta$$

$$y = r_0 \sin\theta \quad \theta \in (0, 360°);$$

$$z = h/2(\cos\theta - 1)$$

Wherein $r_0$ denotes a radius of the first constraint component 110, $\theta$ denotes an angular range, h denotes an axial vertical distance of long-axis end sections of the elliptical line, and x, y, and z denote coordinates of a point on the elliptical line on an x-axis, a y-axis, and a z-axis, respectively.

In some embodiments, the segmented continuous smooth curve may include an even number of symmetric spiral lines and an even number of transition lines which form a closed loop. In some embodiments, the transition lines may be arbitrary smooth curved segments. In some embodiments, the spiral lines and the transition lines may be tangent at connection points and may be smooth and derivable. In some embodiments, all the curved lines may be connected to form a closed circle exactly. The spiral lines may correspond to a linear time delay change. The transition lines may not participate in time delay measurement.

Figure 3:
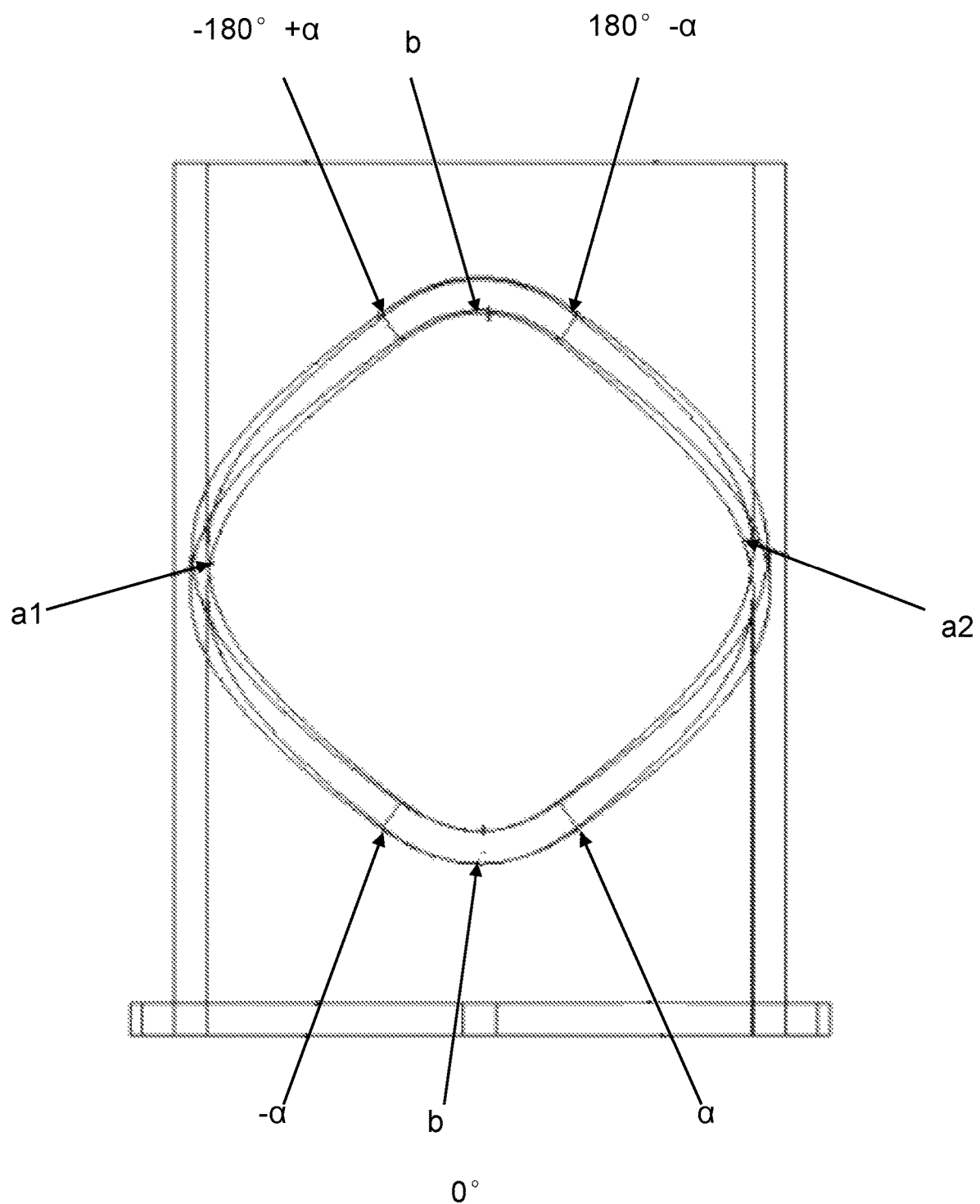
FIG. 3 is a schematic diagram illustrating a distribution of spiral lines and transition lines on a first constraint component according to some embodiments of the present disclosure.
Figure 4:
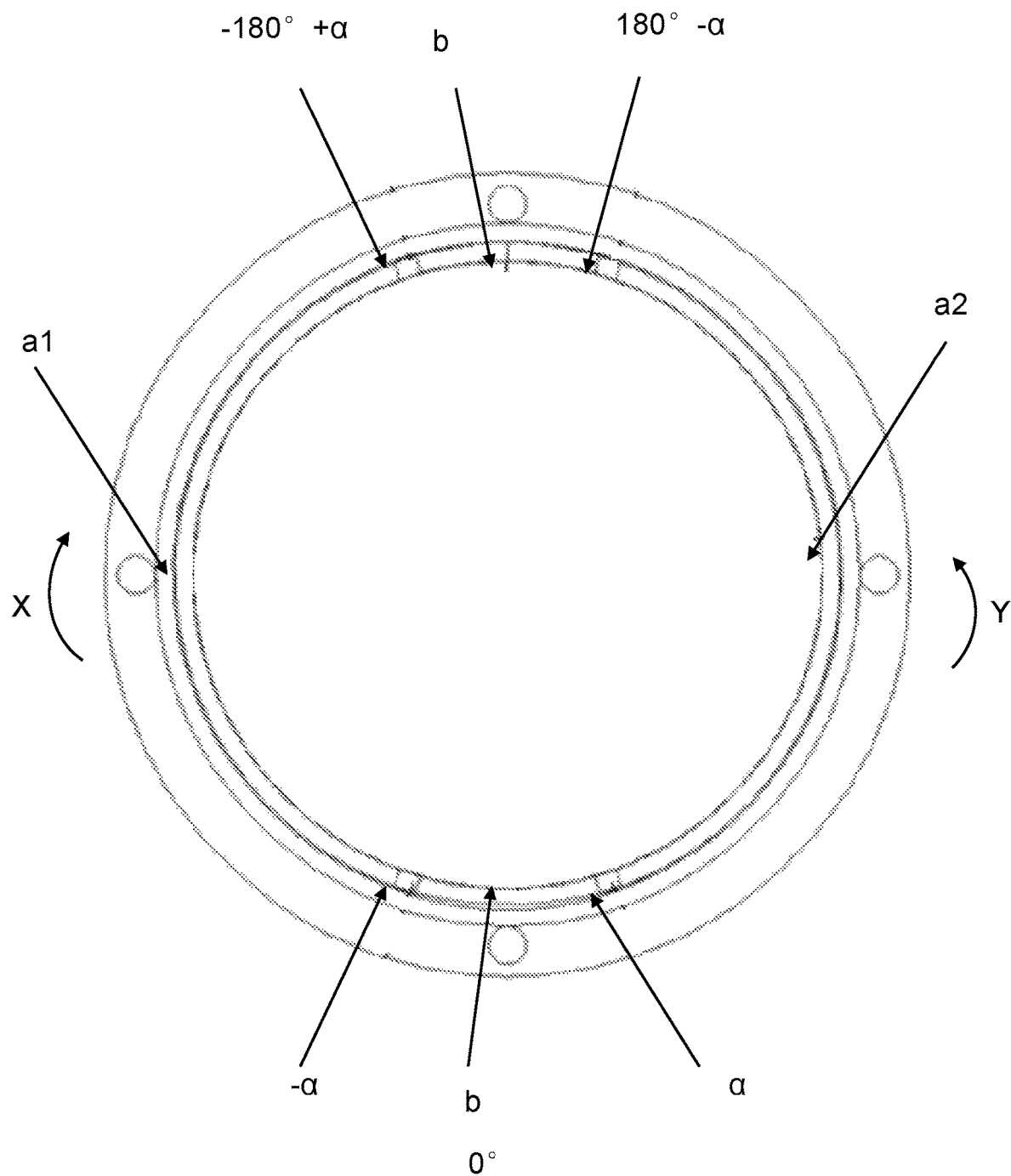
FIG. 4 is a projection of a closed-track line structure on a cross section of a first constraint component according to some embodiments of the present disclosure.

As illustrated in FIG. 3 and FIG. 4, in some embodiments, a shape of a closed curved groove may be composed of two symmetrical spiral lines and transition lines corresponding to the two symmetrical spiral lines. The two symmetrical spiral lines may include a forward spiral line and/or a reverse spiral line. The transition lines may connect the two symmetrical spiral lines to form a closed derivable smooth curve, thereby forming the closed curved groove.

In some embodiments, during a phase of the spiral lines, the third constraint component 130 may produce a linear change translation along an axial direction. In some embodiments, during a phase of the transition lines, the second constraint component 120 may smoothly transition to create a closed smooth motion. A proportion of the spiral lines and the transition lines may be arbitrarily selected in principle based on an actual application. In some embodiments, a proportion of the spiral lines to a circumference and a proportion of the transition lines to the circumference may be 0.8 and 0.2, respectively.

In some embodiments, the spiral lines may include the forward spiral line and the reverse spiral line.

An equation of the forward spiral line is expressed as:

$$x = r_0\cos\theta$$
$$y = r_0\sin\theta \quad \theta \in \left((i-1)\frac{360°}{n} + \alpha, i\frac{360°}{n} - \alpha\right),$$
$$z = \frac{2h}{360°}\theta$$

$$n \in (2,4,6,8 \ldots); i = 1,2,3, \ldots, \frac{n}{2};$$

An equation of the reverse spiral line is expressed as:

$$x = r_0\cos\theta$$
$$y = r_0\sin\theta \quad \theta \in \left(-(i-1)\frac{360°}{n} - \alpha, -i\frac{360°}{n} + \alpha\right),$$
$$z = -\frac{2h}{360°}\theta$$

$$n \in (2,4,6,8 \ldots); i = 1,2,3, \ldots, \frac{n}{2};$$

Wherein $r_0$ denotes a radius of the first constraint component 110, $\theta$ denotes an angular range corresponding to the spiral lines, h denotes half a pitch of the spiral lines, the pitch refers to a straight-line distance between a starting point and an end point of a circumference corresponding to the forward spiral line or the reverse spiral line, and $4\alpha$ denotes an angle of a closed cycle transition line. In some embodiments, a projection of the closed curved groove on a cross section of the first constraint component 110 may be a closed circle. The spiral lines and the transition lines may be distributed within 0-360° of the circle, the equation of the forward spiral line or the equation of the reverse spiral line are expressed piecewise, and x, y, and z denote coordinates of a point on a spiral line on an x-axis, a y-axis, and a z-axis, respectively.

In some embodiments, a target optical delay may be within a range of 0-1000 ps. A 1000 ps delay may require approximately a length change of 300 mm in an optical path. A light beam may travel from the light input interface 150 to the light conversion device 140 and then to the light output interface 160, using 90° double reflectors. If the light beam only travels back and forth once, a position change of 150 mm is required, i.e., a value of z may be within a range of 0-150 mm. 0 and 150 mm may correspond to two endpoints of the spiral lines. Any value between 0-150 mm may correspond to an axial distance from a corresponding point to the starting point on the spiral lines.

When the light propagates in air or vacuum, a dielectric constant is n=1, a speed c of light is constant, and a change of the optical delay may be within a range of 0-1000 ps based on a formula $\Delta T=2nz/c$. Taking the proportion of the transition lines to the circumference as 0.2, and the proportion of the two spiral lines to the circumference as 0.8, then each of the two transition lines may account 36°, an angle of the forward spiral line may be $\theta \in (18°, 162°)$, and an angle of the reverse spiral line may be $\theta \in (-18°, -162°)$.

Considering a relationship between a radius of the first constraint component 110 and a force on the positioning convex 131 under a high-speed rotation condition, if the radius of the first constraint component 110 is 150 mm, the larger the radius, the smaller a rate of a force change. The embodiment designed on the basis of the above parameters may realize a high-speed optical delay line with no spot distortion in a length of the optical path within a delay range of 0-1000 ps.

In some embodiments, the target optical delay may be within a range of 0-500 ps. The 500 ps delay may require approximately a length change of 150 mm in the optical path. The light beam may travel from the light input interface 150 to the light conversion device 140 and then to the light output interface 160, using the 90° double reflectors. If the light beam only travels back and forth once, a position change of 150 mm is required, i.e., a value of z may be within a range of 0-75 mm. 0 and 75 mm may correspond to two endpoints of the spiral lines. Any value between 0-75 mm may correspond to an axial distance from a corresponding point to the starting point on the spiral lines.

When the light propagates in air or vacuum, the dielectric constant is n=1, the speed c of light is constant, and the change of the optical delay may be within a range of 0-500 ps based on the formula $\Delta T=2nz/c$. Taking the proportion of the transition lines to the circumference as 0.2, and the proportion of the two spiral lines to the circumference as 0.8, then each of the two transition lines may account 36°, an angle of the forward spiral line may be $\theta \in (18°, 162°)$, and the angle of the reverse spiral line may be $\theta \in (-18°, -162°)$.

Considering the relationship between the radius of the first constraint component 110 and the force on the positioning convex 131 under the high-speed rotation condition, if the radius of the first constraint component 110 is 100 mm, the larger the radius, the smaller the rate of the force change. The embodiment designed on the basis of the above parameters may realize a high-speed optical delay line with no spot distortion in the length of the optical path within the delay range of 0-1000 ps.

In some embodiments, the closed-track optical delay module may further include a controller, a synchronization interface, a field programmable gate array (FPGA) module, a power supply, an encoder, an auxiliary lubrication device, a grating scale, an input optical fiber coupler, and an output optical fiber coupler. The input optical fiber coupler and the output optical fiber coupler may be respectively disposed at the light input interface and the light output interface. The input optical fiber coupler and the output optical fiber coupler may be electrically connected with the controller.

In some embodiments, the closed-track optical delay module may further include a processor. The processor may be in communication connection with the driving control device and the light conversion device, and configured to determine and control an operating power of the driving control device and determine and control the selection of the light conversion device.

In some embodiments, the closed-track optical delay module may include an optical device, an opto-mechanical device, a mounting bracket, a transition connection device, etc. The optical device may include the light conversion device 140, the input optical fiber coupler, and the output optical fiber coupler. The opto-mechanical device may include the driving control device 190, the first constraint component 110, the second constraint component 120, the third constraint component 130, a controller, a drive command, a communication interface, a pigtail fiber, etc.

In some embodiments, the closed-track optical delay module may externally provide two optical fiber interfaces (i.e., the light input interface 150 and the light output interface 160) for inputting and outputting a laser light, respectively. A power supply and control interface of the driving control device 190 may be configured to control a rotational speed of the first constraint component 110. The drive command may include an acquisition trigger signal configured to trigger an acquisition card to acquire a signal, thereby realizing high-precision equi-angular sampling.

In some embodiments, as illustrated in FIG. 2, the light input interface 150, the light output interface 160, the light conversion device 140, the first constraint component 110, the second constraint component 120, and the third constraint component 130 may be disposed on the same housing 180 or base 170. Each component ensures that a center of a light beam is in a same plane. The incident light may be transmitted by an optical fiber at the light input interface 150 through coupling and converted into a collimated light planar wave at an end of the optical fiber through an optical fiber coupler. A transition line region may not be used as a delay record region. The incident light and an emergent light may simply cause the light to be in exactly opposite directions without introducing other distortions.

In some embodiments, the light input interface 150 ensures that the incident light may be irradiated onto the light conversion device 140. The incident light may be incident from the light input interface 150 to reach the light conversion device 140. A first light modulation device may be disposed at the light input interface 150.

In some embodiments, the first light modulation device may implement modulation of the incident light, so that the incident light irradiated onto the light conversion device 140 may be converted into at least one of a parallel light, a convergent light, a divergent light, a linearly polarized light, a circularly polarized light, an elliptically polarized light, a broadband light, a narrowband light, a single-beam light, a multi-beam light, a point frequency light, a linearly modulated light, a vortex light, and a modulated coded light, thereby making beam transmission more standardized and safer.

In some embodiments, the light conversion device 140 may be connected with the third constraint component 130 and may move along with the third constraint component 130. The incident light may move along with the light conversion device 140. A length of the optical path of the incident light reaching the light conversion device 140 may change, resulting in an optical delay. The light conversion device 140 may change a transmission direction of the incident light, and the delayed light may be emitted through the light output interface 5. The light conversion device 140 may be a single plane reflector, a 90° biplane reflector group, a hollow reflector, a curved mirror, a curved mirror group, a prism, a prism group, a grating, a grating group, a phase plate, a phase plate group, a dielectric plate, a metamaterial device, a light excitation device, a light receiving device, or the like.

In some embodiments, in order for the light output interface 160 to ensure that the delayed beam passing through the light conversion device 140 is effectively emitted, a second light modulation device may be disposed at the light output interface 160, so that the emergent light may be at least one or the parallel light, the convergent light, the divergent light, the linearly polarized light, the circularly polarized light, the elliptically polarized light, the broadband light, the single-beam light, the multi-beam light, the narrowband light, the point frequency light, the linearly modulated light, the vortex light, and the modulated coded light, thereby making the light transmission more standardized and safer.

The closed-track optical delay module provided by embodiments of the present disclosure not only greatly improves the detection efficiency of a photoelectric detection system, especially a terahertz detection system, but also does not have beam deformation due to curved surface reflections and does not have signal distortions caused by depth-of-field changes due to focused beams. The signal quality is greatly improved under the premise of ensuring the detection efficiency. In addition, because the incident beam may be the parallel light, a relatively large reflective mirror may also be used for phase delay control of high-power beams, opening up new application scenarios, such as laser remote focusing, or the like.

The closed-track optical delay module can be widely used in the terahertz detection system, an optical coherent tomography system, a radar system, a Fourier transform system, a Michelson interferometer system, a laser remote focusing system, an imaging zoom system, an optical field imaging system, a remote sensing system, a surface beam sensing system, a line beam sensing system, a multi-dimensional diffraction system, a multi-dimensional holographic system, a quantum communication system, or the like, thereby greatly improving the efficiency and the range of system optical delay under the premise of ensuring the quality of the beam.

In some embodiments of the present disclosure, the closed-track line structure may determine the measurement range of the closed-track optical delay module. The measurement range of the closed-track optical delay module may be directly proportional to a length of an effective segment of the track line structure. The measurement range may be selected according to the need. In theory, the closed-track optical delay module may not be limited by the measurement range, but only by a volume and cost. In general, a small measurement range of 0-100 ps, a medium measurement range of 0-1000 ps, and a large measurement range of more than 1000 ps may be selected. The closed-track optical delay module is suitable for a desktop photoelectric instrument and a large optical engineering system.

The driving control device may realize high-frequency and high-speed rotation, optimize the connection quality, reduce friction loss, and select high-quality materials. Under the constraint of the smooth curve, the first constraint component 110 may rotate at a speed of 6000 r/min or even higher. Combined with the design of the closed-track line structure, one rotation may correspond to at least two full cycle delay changes, enabling the delay cycle to reach over 100 Hz. As the light conversion device 140 may use a theoretically distortionless planar mirror structure, the device may present high precision and good reliability. Therefore, the incident light may enter through the light input interface 150, pass through the light conversion device 140, and exit from the light output interface 160 without spot distortion, ensuring the integrity and accuracy of the signal. Furthermore, a size of the planar mirror structure is easy to adjust, thereby meeting a delay application of a large aperture beam.

In addition, the above features may often be satisfied simultaneously, thereby realizing delay applications with a large range of delay, high delay speed, and high-quality beam, thus greatly improving the quality of the corresponding photoelectric detection system.

In some embodiments of the present disclosure, one of the first constraint component, the second constraint component, and the third constraint component may be driven to rotate by the driving control device, and the other of the first constraint component, the second constraint component, and the third constraint component may be fixedly disposed. Due to the constraint fit relationship between the positioning convex, the closed curved groove, and the straight line groove, the next one of the first constraint component, the second constraint component, and the third constraint component may move parallel to the straight line groove, which in turn drives the light conversion device to realize linear movement. Since the incident light is irradiated onto the light conversion device and then emitted, a displacement change of the light conversion device leads to a delay change in the incident time and exiting time of light beams, thereby realizing a set effect of optical delay.

Some embodiments of the present disclosure provide a terahertz system comprising the closed-track optical delay module as described above.

In some embodiments, the terahertz system may be a terahertz time domain spectroscopy system, a terahertz time domain spectroscopy imaging system, or a terahertz non-destructive testing system.

Some embodiments of the present disclosure provide a photoelectric system comprising the closed-track optical delay module as described above.

FIG. 5 is a flowchart illustrating an exemplary process for determining an operating power according to some embodiments of the present disclosure. As illustrated in FIG. 5, a process 500 may include the following operations. In some embodiments, the process 500 may be executed by a processor.

In some embodiments, the closed-track optical delay module 100 may further include the processor (not shown in the figure) configured to determine the operating power for a driving control device.

In some embodiments, the processor may be in communication connection with the driving control device of the closed-track optical delay module.

The operating power refers to a driving power required to operate the driving control device. As illustrated before, combined with the design of the closed-track line structure, one rotation of the constraint component may correspond to at least two full cycle delay changes. Accordingly, different operating powers may affect time taken by the driving control device to drive the constraint component to rotate one circumference, which in turn affects time at which the delay changes occur.

In some embodiments, the operating power may be determined based on historical experience or actual needs. For example, the processor may analyze at least one historical power in historical operating data of the closed-track optical delay module and use a historical power that is most frequently used as the operating power. As another example, the processor may determine the operating power by obtaining a manual input from relevant staff.

In some embodiments, the processor may also determine the operating power based on a demand for an optical delay. The demand for the optical delay may include a target optical delay time.

Operation 510, a vector to be matched may be constructed based on a connection feature, a track feature of a closed-track line structure, a device feature of the light conversion device, and the target optical delay time.

The connection feature refers to data characterizing a connection of the driving control device with a constraint component. In some embodiments, the constraint component may include at least one of the first constraint component 110, the second constraint component 120, the third constraint component 130, or the like. In some embodiments, the connection feature may be represented using a vector. For example, 1 indicates connected, 0 indicates not connected, and (1, 0, 0), (0, 1, 0), and (0, 0, 1) indicate that the first constraint component is connected with the driving control device, the second constraint component is connected with the driving control device, and the third constraint component is connected with the driving control device, respectively.

In some embodiments, the connection feature may be obtained by the processor in various ways. For example, the connection feature may be determined by obtaining the manual input. As another example, different sensing chips may be provided on different constraint components, the processor may determine the connection feature based on the sensing chips.

The track feature refers to a feature related to a shape of the closed-track line structure. In some embodiments, the track feature may be characterized using a curve equation, such as at least one of an equation for an elliptical line, an equation for a forward spiral line, an equation for a reverse spiral line, or the like. More descriptions regarding the equation for the elliptical line, the equation for the forward spiral line, and the equation for the reverse spiral line may be found in the previous descriptions.

In some embodiments, the track feature may be obtained by the processor in various ways. For example, the track feature may be obtained by design parameters of the closed-track line structure.

The device feature refers to a feature related to the light conversion device, such as at least one of a size of the light conversion device, a length of the optical path, or the like.

In some embodiments, the device feature may be obtained by the processor in various ways. For example, the device feature may be obtained by experimental testing, or by obtaining the relevant parameters of the light conversion device, or the like.

The target optical delay time refers to a required optical delay time. The optical delay time is a difference between an actual time and a theoretical time a light takes to travel through a segment of optical path. In some embodiments, the optical delay time may be positively correlated to the length of the optical path. That is, the longer the optical path, the greater the optical delay time.

In some embodiments, the target optical delay time may be obtained by the processor in various ways. For example, the target optical delay time may be obtained based on historical data acquisition, preset based on actual operating requirements, etc.

The vector to be matched refers to a vector configured to characterize a current feature of the closed-track optical delay module. In some embodiments, the processor may construct, based on the connection feature, the track feature of the closed-track line structure, the device feature of the light conversion device, and the target optical delay time, the vector to be matched.

Operation 520, a candidate power may be determined by searching in a reference database based on the vector to be matched.

The candidate power refers to a power of a candidate driving control device. In some embodiments, the processor may determine at least one candidate power by searching in the reference database based on the vector to be matched.

The reference database refers to a database storing historical data. In some embodiments, the reference database may be stored in the processor. In some embodiments, the reference database may include a plurality of reference vectors and a reference power corresponding to each of the plurality of reference vectors.

In some embodiments, the plurality of reference vectors may be constructed based on historical operating data of the closed-track optical delay module. For example, the plurality of reference vectors may be constructed based on historical connection feature, historical track features, historical device features, and historical optical delay times in the historical operating data. As another example, the processor may construct historical feature vectors based on the historical connection feature, the historical track features, the historical device features, the historical optical delay times, and historical powers in the historical data, and determine at least one clustering center by clustering the historical feature vectors through a clustering algorithm. Different clustering centers may characterize the driving control devices of different operating states. In some embodiments, the processor may determine reference vectors based on feature vectors corresponding to the at least one clustering center, and determine historical powers corresponding to the at least one clustering center as reference powers corresponding to the reference vectors. The clustering algorithm may include, but is not limited to, K-Means clustering and/or a density-based spatial clustering of applications with noise (DBSCAN), etc.

In some embodiments, the reference database may be updated based on a preset period, such as once a week. The preset period may be determined based on a user input.

In some embodiments, the processor may calculate a first similarity between the vector to be matched and the reference vector, and select the operating power corresponding to the reference vectors of which the first similarity is greater than a first similarity threshold as the candidate power. In some embodiments, the first similarity threshold may be set based on experience.

Operation 530, the processor may determine, based on the connection feature, the track feature, the device feature, and the candidate power, the operating power.

In some embodiments, the processor may construct, based on historical connection features, historical track features, and historical device features corresponding to the candidate power, a candidate feature vector, construct, based on the connection feature, the track feature, and the device feature, a current feature vector, and calculate a distance between the candidate feature vector and the current feature vector. The processor may take the candidate feature vector with a closest distance to the current feature vector as the target feature vector, and determine, based on the candidate power corresponding to the target feature vector, the operating power.

In some embodiments, the processor may determine, based on the connection feature, the track feature, the device feature, and the candidate power, the operating power through a preset algorithm. More descriptions regarding the preset algorithm may be found in the related description of FIG. 6.

In some embodiments, the processor may adjust a power of the driving control device based on the operating power. For example, in response to determining that a current power of the driving control device is different from the operating power, the processor may control the driving control device to adjust the power to the operating power.

According to some embodiments of the present disclosure, automated control of the power of the driving control device can be realized by determining the operating power, thereby realizing automated control of the length of the optical path within the light conversion device, and thus better controlling the optical delay time.

Figure 6:
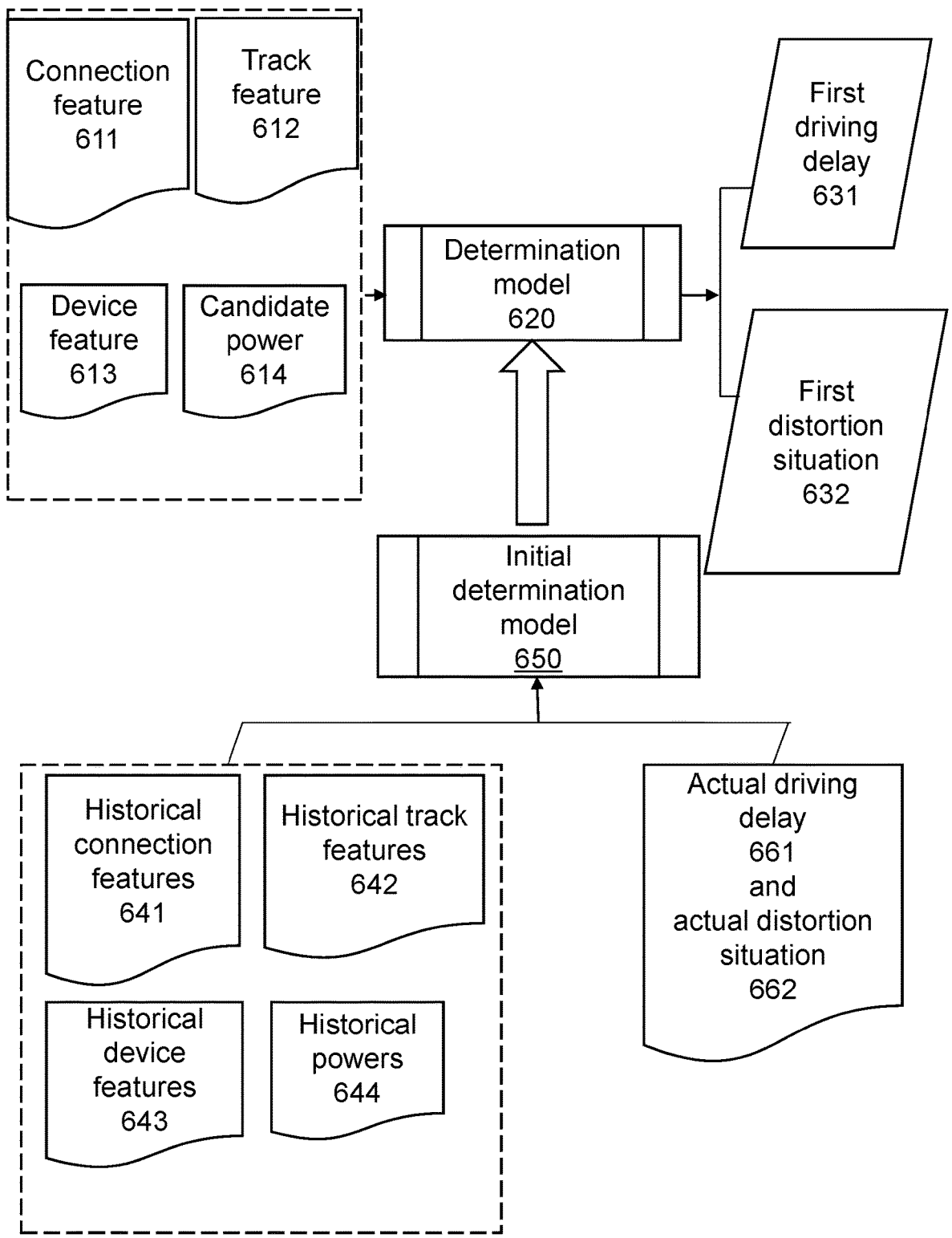
FIG. 6 is a schematic diagram illustrating a structure of a determination model according to some embodiments of the present disclosure.

FIG. 6 is a schematic structural diagram illustrating a determination model according to some embodiments of the present disclosure. As illustrated in FIG. 6, the determination model may include the following descriptions.

In some embodiments, a processor may determine, based on a connection feature 611, a track feature 612, a device feature 613, and a candidate power 614, a second driving delay 631 and a second distortion situation 632 corresponding to a driving control device when operating based on a candidate power through a determination model 620.

The second driving delay 631 refers to an optical delay time when the driving control device operates based on the candidate power.

The second distortion situation 632 refers to data characterizing an optical information loss. In some embodiments, the second distortion situation 632 may include at least one of an optical intensity loss, an optical wavelength loss, or the like. In some embodiments, the second distortion situation 632 may be represented by a numerical value. For example, if the second distortion situation 632 is 0.01, the optical information loss may be 1%.

The determination model 620 refers to a model configured to determine the second driving delay 631 and the second distortion situation 632. In some embodiments, the determination model 620 may be a machine learning model, such as a neural network (NN), or the like. In some embodiments, the processor may determine, by the determination model 620, the first drive delay and the second distortion situation corresponding to the driving control device when the driving control device operates based on the candidate power.

In some embodiments, an input of the determination model 620 may include the connection feature 611, the track feature 612, the device feature 613, and the candidate power 614, and an output of the determination model 620 may include the second driving delay 631 and the second distortion situation 632. More descriptions regarding the connection feature 611, the track feature 612, the device feature 613, and the candidate power 614 may be found in the related descriptions of FIG. 5.

In some embodiments, the determination model 620 may be obtained by training based on a plurality of training samples with labels. The processor may input a plurality of labeled training samples into an initial determination model 650, construct a loss function based on the labels and results of the initial determination model 650, and iteratively update parameters of the initial determination model 650 based on the loss function. The model training may be completed when the loss function of the initial determination model 650 satisfies a preset condition, and the trained determination model 620 may be obtained. The preset condition may be that the loss function converges, a count of iterations reaches a threshold, etc.

In some embodiments, the training samples may include historical connection features 641, historical track features 642, historical device features 643, and historical powers 644 in the historical operating data. In some embodiments, the labels may include an actual driving delay 661 and an actual distortion situation 662 corresponding to the historical operating data. In some embodiments, the training samples may be determined by the processor in various ways. For example, the training samples may be determined based on the historical operating data, etc.

In some embodiments, in response to determining that the second driving delay and the second distortion situation corresponding to the candidate power satisfy a preset condition, the processor may determine the candidate power as the operating power.

In some embodiments, the preset condition may include that a difference between the second driving delay and the target optical delay time is less than a first threshold and the second distortion situation is less than a second threshold. In some embodiments, the first threshold and the second threshold may be obtained based on at least one of experience and historical data. For example, the first threshold may be 0, indicating that the second driving delay is required to be equal to the target optical delay time. The first threshold may also be 0.01, indicating that the difference between the second driving delay and the target optical delay time is relatively small. As another example, the second threshold may be 0, indicating no optical information loss. The second threshold may also be 0.01, indicating that the optical information loss is small.

In some embodiments of the present disclosure, when the operating power is determined, the second driving delay and the second distortion situation corresponding to different operating states may be comprehensively considered. By setting the screening conditions based on the second driving delay and the second distortion situation, the candidate power may be more comprehensively compared, thereby selecting the most suitable operating power.

Figure 7:
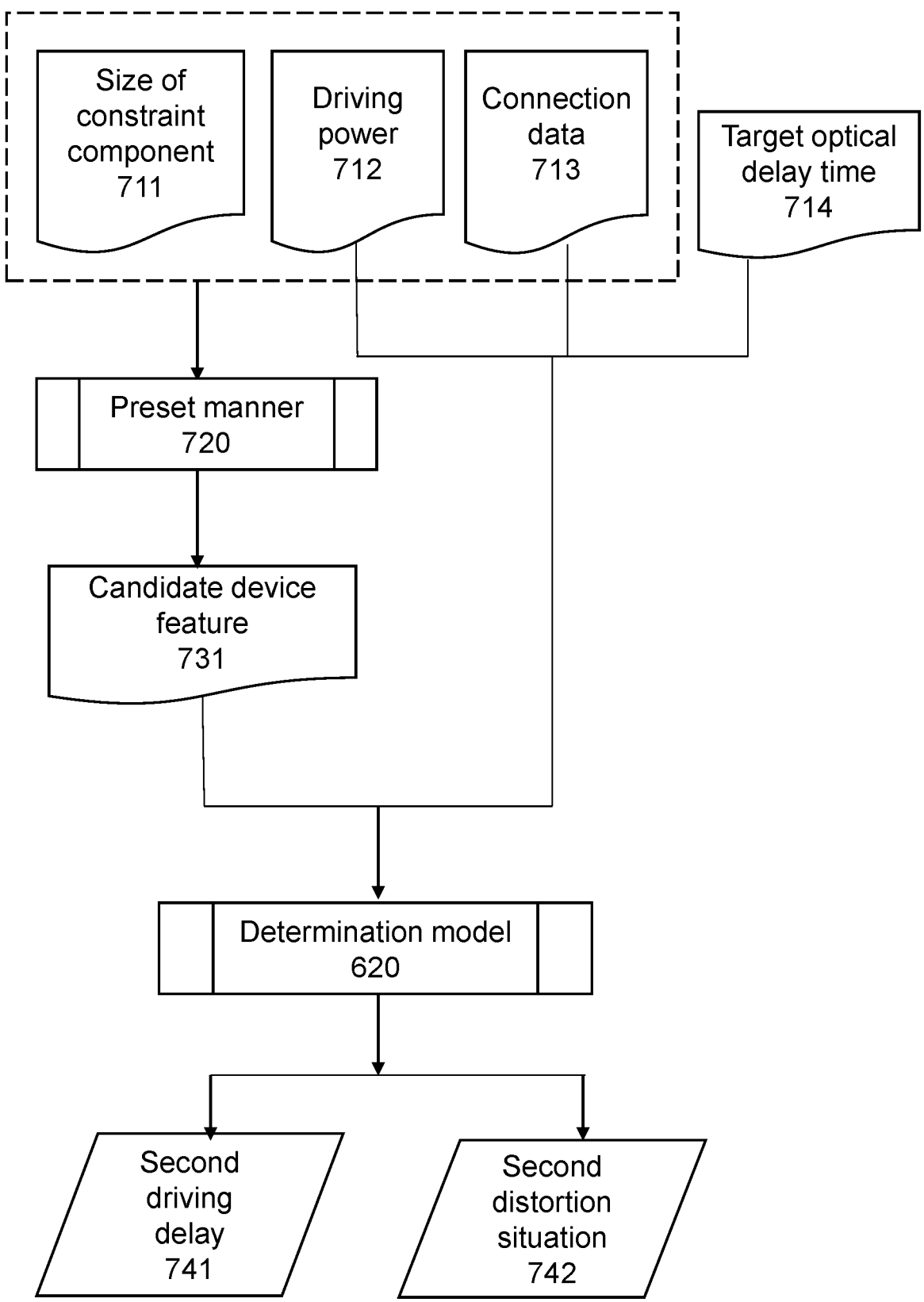
FIG. 7 is a schematic diagram illustrating a process of determining a target light conversion device according to some embodiments of the present disclosure.

FIG. 7 is a schematic diagram illustrating a process of determining a target light conversion device according to some embodiments of the present disclosure. As illustrated in FIG. 7, the process of determining the target light conversion device may include the following content.

In some embodiments, a processor may determine, based on a size of constraint component 711, a driving power 712 of a driving control device, and connection data 713, a candidate device feature 731 corresponding to a candidate light conversion device through a preset manner 720.

The size of the constraint component 711 refers to a size parameter related to the constraint component. In some embodiments, size of the constraint component may include a size corresponding to at least one of the first constraint component 110, the second constraint component 120, and the third constraint component 130, such as at least one of a length, a diameter, a wall thickness, etc. In some embodiments, the size of the constraint component 711 may be determined by the processor in various ways. For example, the size of the constraint component 711 may be determined by obtaining a manual input, a design parameter of the constraint component, etc.

The driving power 712 refers to an operating power of the driving control device, and may include a current power or an operating power output from the determination model. In some embodiments, the driving power 712 may be determined by the processor in various ways. For example, the driving power 712 may be determined by obtaining the manual input, historical operating data, an output of the determination model, an actual operation, etc.

The connection data 713 refers to data characterizing a connection relationship between a constraint component and the light conversion device. In some embodiments, the connection data 713 may be represented using a vector. For example, 1 indicates connected, 0 indicates not connected, and (1, 0, 0), (0, 1, 0), and (0, 0, 1) indicate that the first constraint component is connected with the light conversion device, the second constraint component is connected with the light conversion device, and the third constraint component is connected with the light conversion device, respectively.

The candidate device feature 731 refers to a device feature corresponding to the candidate light conversion device. The candidate light conversion device refers to one or more candidate light conversion devices. In some embodiments, the candidate device feature 731 may include at least one of a size of the light conversion device, an optical path length of light within the light conversion device, or the like. More descriptions regarding the device feature may be found in the related descriptions of FIG. 5. More descriptions regarding the light conversion device may be found in the related descriptions of FIG. 2.

The preset manner 720 refers to a manner for determining the candidate device feature 731. In some embodiments, the preset manner 720 may include determining the candidate device feature 731 by analyzing test data, etc. For example, the candidate device feature 731 may be determined by performing a plurality of experiments on the light conversion device, detecting results of the plurality of experiments corresponding to the light conversion device, statistically counting the results of the plurality of experiments, and analyzing the statistically counted data. The results of the plurality of experiments may include a device feature corresponding to a current experiment. The statistics may include at least one of statistical plurality, average, etc. The experimental results may include the device features corresponding to the current experiment. The statistics may include at least one of statistical mode, average, etc.

In some embodiments, the processor may determine, by the determination model 620, a first driving delay 741 and a first distortion situation 742 generated by using the candidate light conversion device when the driving control device operates based on the driving power. In this case, an input of the determination model 620 may also include the candidate device feature 731, the connection data 713, the driving power 712, and the target optical delay time 714, and an output of the determination model 620 may also include the first driving delay 741 and the first distortion situation 742. The first driving delay 741 may be similar to the first driving delay, and the first distortion situation 742 may be similar to the first distortion situation. More descriptions regarding the first driving delay 741 and the first distortion situation 742 may be found in the related descriptions regarding the first driving delay and the first distortion situation.

In some embodiments, the training samples for training the determination model 620 may also include historical device features, historical connection data, historical driving powers, and historical target optical delay times in the historical operating data. More descriptions regarding the training samples and the labels may be found in the related descriptions of FIG. 6.

In some embodiments, in response to determining that the first driving delay 741 and the first distortion situation 742 satisfy a preset condition, the processor may determine the candidate light conversion device as the target light conversion device. More descriptions regarding the preset condition may be found in the related descriptions of FIG. 6.

Different optical paths can be generated using different light conversion devices, which in turn affects a propagation path of the incident light. In some embodiments of the present disclosure, the first driving delay and the first distortion situation corresponding to different operating states may be comprehensively considered. By setting screening conditions based on the first driving delay and the first distortion situation, the candidate light conversion device may be more comprehensively compared, thereby selecting the most suitable light conversion device. The light conversion device may be determined using the determination model, so that the accuracy and efficiency of the target light conversion device can be improved during selection of the light conversion device.

The basic concept has been described above. Obviously, for those skilled in the art, the above detailed disclosure is only an example, and does not constitute a limitation to the present disclosure. Although not expressly stated here, those skilled in the art may make various modifications, improvements and corrections to the present disclosure. Such modifications, improvements and corrections are suggested in this disclosure, so such modifications, improvements and corrections still belong to the spirit and scope of the exemplary embodiments of the present disclosure.

Meanwhile, the present disclosure uses specific words to describe the embodiments of the present disclosure. For example, "one embodiment", "an embodiment", and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures or characteristics in one or more embodiments of the present disclosure may be properly combined.

In addition, unless clearly stated in the claims, the sequence of processing elements and sequences described in the present disclosure, the use of counts and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This method of disclosure does not, however, imply that the subject matter of the disclosure requires more features than are recited in the claims. Rather, claimed subject matter may lie in less than all features of a single foregoing disclosed embodiment.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A closed-track optical delay module, comprising a first constraint component with a closed-track line structure, a second constraint component with a straight line groove, a third constraint component with a positioning convex, a light conversion device, a light input interface, a light output interface, a base, a housing, and a driving control device; wherein
the first constraint component is configured as a cylindrical component, and the closed-track line structure is disposed on a circumferential wall of the cylindrical component; the closed-track line structure is in a form of a smooth curve, and the smooth curve is a continuous smooth curve or a segmented continuous smooth curve; and the closed-track line structure is a closed curve groove;
the positioning convex forms a constraint fit relationship with the closed curve groove and the straight line groove, respectively;
a length of the straight line groove is greater than or equal to a straight-line distance between two end surfaces where vertices of the closed curved groove are located, the end surfaces are perpendicular to an axial direction of the first constraint component;
one of the first constraint component, the second constraint component, and the third constraint component is connected with the driving control device to be driven to rotate, the other of the first constraint component, the second constraint component, and the third constraint component is fixedly disposed, and a next one of the first constraint component, the second constraint component, and the third constraint component is connected with the light conversion device and moves parallel to the straight line groove; and
the light input interface and the light output interface are disposed on the housing, and the light input interface is used for an incident light to be irradiated onto the light conversion device; the light output interface is used for a delayed beam passing through the light conversion device to be emitted from the housing.

2. The closed-track optical delay module of claim 1, wherein;
the continuous smooth curve is an elliptical line, which is represented by:

$x = r_0 \cos\theta$ $y = r_0 \sin\theta \theta \in (0, 360°)$;

$z = h/2(\cos\theta - 1)$ wherein $r_0$ denotes a radius of the first constraining component, $\theta$ denotes an angular range, and h denotes an axial vertical distance of long-axis end sections of the elliptical line;
the segmented continuous smooth curve includes an even number of spiral lines and an even number of transition lines, and connection points between the even number of spiral lines and the even number of transition lines are smoothly connected to form a closed loop;
an equation expression for forward spiral lines is represented by:

$$\begin{aligned} x &= r_0 \cos\theta \\ y &= r_0 \sin\theta \\ z &= \frac{2h}{360°}\theta \end{aligned} \quad \theta \in \left((i-1)\frac{360°}{n} + \alpha, i\frac{360°}{n} - \alpha\right),$$

$$n \in (2,4,6,8 \ldots); i = 1,2,3, \ldots, \frac{n}{2};$$

an equation expression for reverse spiral lines is represented by:

$$\begin{aligned} x &= r_0 \cos\theta \\ y &= r_0 \sin\theta \\ z &= -\frac{2h}{360°}\theta \end{aligned} \quad \theta \in \left(-(i-1)\frac{360°}{n} - \alpha, -i\frac{360°}{n} + \alpha\right),$$

$$n \in (2,4,6,8 \ldots); i = 1,2,3, \ldots, \frac{n}{2};$$

wherein $r_0$ denotes the radius of the first constraining component, $\theta$ denotes an angular range corresponding to the spiral lines, h denotes half of a pitch of the spiral lines, the pitch referring to a straight-line distance between a starting point and an end point of a circumference of the forward spiral line or the reverse spiral line, n denotes a value of a count of the spiral lines, and $2n\alpha$ denotes an angle of the transition lines within a closed period.

3. The closed-track optical delay module of claim 1, further comprising a first light modulation device, wherein the first light modulation device is disposed at the light input interface to modulate the incident light into at least one of a parallel light, a convergent light, a divergent light, a linearly polarized light, a circularly polarized light, a elliptically polarized light, a broadband light, a narrowband light, a single-beam light, a multi-beam light, a point frequency light, a linearly modulated light, a vortex light, and a modulated coded light.

4. The closed-track optical delay module of claim 1, wherein the light conversion device includes at least one of a single plane reflector, a 90° biplane reflector group, a hollow reflector, a curved mirror, a curved mirror group, a prism, a prism group, a grating, a grating group, a phase plate, a phase plate group, a dielectric plate, a metamaterial device, a light excitation device, and a light receiving device.

5. The closed-track optical delay module of claim 1, further comprising a second light modulation device, wherein the second light modulation device is disposed at the light output interface to modulate the delayed light passing through the light conversion device into at least one of a parallel light, a convergent light, a divergent light, a linearly polarized light, a circularly polarized light, a elliptically polarized light, a broadband light, a single-beam light, a multi-beam light, a narrowband light, a point frequency light, a linearly modulated light, a vortex light, and a modulated coded light.

6. A terahertz system, comprising the closed-track optical delay module of claim 1.

7. A photoelectric system, comprising the closed-track optical delay module of claim 1.

* * * * *